United States Patent [19]

Gerson et al.

[11] Patent Number: 5,534,055

[45] Date of Patent: Jul. 9, 1996

[54] PROCESS FOR ALPHA-PHASE METAL PHTHALOCYANINE PIGMENTS

[75] Inventors: Herman Gerson, New York, N.Y.; Abdul Sattar, Mt. Pleasant, S.C.

[73] Assignee: Bayer Corporation, Pittsburgh, Pa.

[21] Appl. No.: 295,342

[22] Filed: Aug. 24, 1994

[51] Int. Cl.$^6$ .................................................. C09B 67/50
[52] U.S. Cl. .......................... 106/413; 106/410; 106/411; 106/412; 106/493; 106/494; 106/496; 540/122; 540/132; 540/133; 540/136; 540/137; 540/140; 540/141; 540/142; 540/144
[58] Field of Search ..................................... 106/410, 411, 106/412, 413, 493, 494, 496; 540/122, 132, 133, 136, 137, 140, 141, 142, 144

[56] References Cited

U.S. PATENT DOCUMENTS

| | | | |
|---|---|---|---|
| 3,729,330 | 4/1973 | Leister et al. | 106/411 |
| 3,960,587 | 6/1976 | Huille et al. | 106/411 |
| 3,984,433 | 10/1976 | Spietschka et al. | 540/132 |
| 4,039,346 | 8/1977 | Kranz | 106/411 |
| 4,104,276 | 8/1978 | Kranz et al. | 540/141 |
| 4,104,277 | 8/1978 | Langley | 106/412 |
| 4,141,904 | 2/1979 | Cabut et al. | 540/123 |
| 4,152,171 | 5/1979 | Barraclough et al. | 106/411 |
| 4,158,572 | 6/1979 | Blackburn et al. | 106/412 |
| 4,221,606 | 9/1980 | Funatsu et al. | 106/411 |
| 4,224,222 | 9/1980 | Spietschka et al. | 540/136 |
| 4,239,685 | 12/1980 | Pigasse | 540/136 |
| 4,257,951 | 3/1981 | Matrick | 540/141 |
| 4,310,359 | 1/1982 | Ehashi et al. | 106/494 |
| 4,313,766 | 2/1982 | Barraclough et al. | 106/411 |
| 4,448,607 | 5/1984 | Johnson et al. | 106/19 F |
| 5,175,282 | 12/1992 | Roth et al. | 540/141 |
| 5,279,654 | 1/1994 | Keirs et al. | 106/20 R |
| 5,284,511 | 2/1994 | Rolf et al. | 106/410 |
| 5,296,033 | 3/1994 | Dietz et al. | 106/412 |
| 5,296,034 | 3/1994 | Dietz et al. | 106/412 |

FOREIGN PATENT DOCUMENTS

| | | |
|---|---|---|
| 422907 | 4/1991 | European Pat. Off. . |
| 629668 | 12/1994 | European Pat. Off. . |
| 629688A1 | 12/1994 | European Pat. Off. . |
| 784843 | 10/1957 | United Kingdom . |
| 1052884 | 8/1974 | United Kingdom . |
| 2211509 | 7/1989 | United Kingdom . |

Primary Examiner—Karl Group
Assistant Examiner—Scott L. Hertzog
Attorney, Agent, or Firm—Joseph C. Gil; Richard E. L. Henderson

[57] ABSTRACT

This invention relates to a process for preparing alpha-phase metal phthalocyanine pigments from crude metal phthalocyanine pigments comprising (a) acid pasting or acid swelling a crude metal phthalocyanine pigment;

(b) dry milling the acid-pasted or acid-swelled metal phthalocyanine pigment in the presence of 5 to 50 parts by weight of a stabilizer per 100 parts by weight of the crude metal phthalocyanine pigment until the average particle size is reduced to less than about 0.5 μm;

(c) finishing the milled metal phthalocyanine pigment by thoroughly mixing said milled metal phthalocyanine pigment with a finishing solvent mixture comprising 3 to 6 parts by weight, relative to the crude metal phthalocyanine pigment, of water and 0.4 to 1.0 parts by weight, relative to the crude metal phthalocyanine pigment, of an organic solvent, optionally in the presence of 0 to 45 parts by weight of a stabilizer per 100 parts by weight of the crude metal phthalocyanine pigment, with the proviso that the total amount of stabilizer used in steps (b) and (c) ranges from 5 to 50 parts by weight per 100 parts by weight of the crude metal phthalocyanine pigment; and (d) isolating the alpha-phase metal phthalocyanine pigment.

20 Claims, No Drawings

PROCESS FOR ALPHA-PHASE METAL PHTHALOCYANINE PIGMENTS

BACKGROUND OF THE INVENTION

This invention relates to a process for the preparation of easily dispersible pigments of the alpha-phase modification of metal phthalocyanine pigments, especially that of copper phthalocyanines. This process provides a simple and cost-effective method for manufacturing red-shade blue pigments having high color strength.

Crude copper phthalocyanine is usually prepared by a reaction of phthalic anhydride or a derivative thereof, urea, and a copper source, or by a reaction of phthalonitrile or a derivative thereof and a copper source in an organic solvent, optionally in the presence of a catalyst such as ammonium molybdate or titanium tetrachloride. The resultant phthalocyanine particles, however, undergo crystal growth during preparation and have a major axis of about 10 to about 200 µm. Such copper phthalocyanines have little or no color value as a pigment for use in inks, coating compositions, plastics, and the like. For this reason, the crude copper phthalocyanine must be further treated to obtain a high color value.

Several methods have been described for preparing pigments having improved color value but these methods typically produce only beta-phase crystal forms or mixtures of alpha- and beta-crystal forms or require the use of special additives or solvent mixtures.

For example, U.S. Pat. Nos. 4,158,572, 4,257,951, and 5,175,282 and British Patent 1,502,884 disclose methods for preparing beta-phase copper phthalocyanine pigments.

U.S. Pat. Nos. 4,039,346 and 4,104,276 disclose the use of certain phthalocyanine derivatives as additives to inhibit the "overcrystallization" that occurs when milled phthalocyanine pigments are recrystallized in organic or aqueous organic solvents. In particular, U.S. Pat. No. 4,039,346 discloses the preparation of alpha-, beta-, or gamma-phase phthalocyanines by finishing the crude pigment in sulfuric acid containing certain aminoalkyl or amino-alkylsulfonamide derivatives of copper phthalocyanine, followed by precipitation with water. U.S. Pat. No. 4,104,276 discloses a process for preparing pigmentary copper phthalocyanine pigments by first dry milling a crude copper phthalocyanine pigment, optionally followed by acid swelling with sulfuric acid, and then stirring the milled pigment in an organic or aqueous organic medium containing aminoalkyl or aminoalkylsulfonamide derivatives of copper phthalocyanine. The method disclosed in U.S. Pat. No. 4,104,276 provides pigments in various crystal forms, typically as mixtures containing both alpha- and beta-forms.

U.S. Pat. No. 4,104,277 discloses a process for preparing copper phthalocyanine pigments in the alpha-phase, the beta-phase, or a mixture thereof by first dry milling a crude copper phthalocyanine pigment (which increases the alpha-phase relative to the beta-phase) and then mixing the milled pigment with an emulsion containing an amine, water, and a surfactant.

U.S. Pat. No. 5,279,654 discloses copper phthalocyanine compositions containing certain aminoalkyl or aminoalkylsulfonamide derivatives of copper phthalocyanine and surfactants which can be milled to obtain pigmentary material containing 10–90% by weight of the alpha-phase crystal form.

U.S. Pat. No. 4,221,606 discloses a process for preparing alpha- or beta-form copper phthalocyanine pigments by stirring the pigment in water containing certain aminoalkyl derivatives of copper phthalocyanine. An alpha-form copper phthalocyanine pigment of unspecified purity was prepared by dissolving the crude pigment in aqueous sulfuric acid, precipitating the copper phthalocyanine in water, and slurrying the precipitated pigment in water containing an aminoalkyl derivative of copper phthalocyanine.

U.S. Pat. No. 3,984,433 discloses a process for preparing purified alpha-form copper phthalocyanine pigments by dissolving the crude pigment in aqueous sulfuric acid, precipitating and isolating copper phthalocyanine sulfate, hydrolyzing the sulfate with water, isolating the copper phthalocyanine, and wet-milling the pigment in water to obtain pigmentary copper phthalocyanine pigment. U.S. Pat. No. 4,224,222 discloses a similar process for preparing purified alpha-form chlorinated copper phthalocyanine pigments (which are inherently less prone to revert to beta-form pigment; see, e.g., U.S. Pat. No. 4,313,766) in which the wet-milling step is carried out in mixtures of water and organic solvents that are miscible with water or form emulsions with water.

U.S. Pat. Nos. 5,296,033 and 5,296,034 disclose closely related processes for preparing alpha-form copper phthalocyanine pigments by wet-milling with a ball mill under certain specific stirring conditions using small-diameter grinding medium, followed by finishing and isolation steps.

U.S. Pat. No. 4,313,766 discloses the preparation of beta-phase pigment if the phthalocyanines are unsubstituted or alpha-phase pigment if the phthalocyanines are chlorine-substituted by first milling the crude pigment and then treating the milled pigment with a polar aliphatic solvent in the presence of certain aminoalkylsulfonamide derivatives of copper phthalocyanine.

British Patent 2,211,509 discloses a process for preparing alpha-phase copper phthalocyanine pigments in which an initial dry-milling step is required to "activate" crude pigment. The activated pigment is then milled in water containing a surfactant. Organic solvents are not used.

European Patent Application 422,907 discloses a process for preparing copper phthalocyanine pigments in the alpha-phase or, more generally, as a mixture containing the beta-phase by dry milling a crude copper phthalocyanine pigment in the absence of a milling aid and in the presence of certain aminoalkyl or aminoalkylsulfonamide derivatives of copper phthalocyanine.

The object of the present invention is to provide an improved process for preparing alpha-phase metal phthalocyanine pigments having excellent dispersibility, tinting strength, clearness, gloss and stability in coating compositions, printing inks, plastics, and the like. The present invention provides an economical route to products that are substantially 100% alpha-phase pigments and excellent dispersibility, brilliancy, and heat stability in plastics, inks, and paints.

SUMMARY OF THE INVENTION

This invention relates to a process for preparing alpha-phase metal phthalocyanine pigments (preferably copper phthalocyanine pigments) from crude metal phthalocyanine pigments comprising (a) acid pasting or acid swelling a crude metal phthalocyanine pigment (preferably a copper phthalocyanine pigment) by (i) treating said crude pigment with about 4 to about 10 parts by weight (preferably 4 to 6 parts by weight), relative to the crude metal phthalocyanine pigment, of an aqueous solution of a mineral acid (preferably sulfuric acid) containing about 60% to about 98% by weight (preferably 64% to 70% by weight) of the mineral acid, preferably at a temperature of about 10° to about 60° C. for about 4 to about 24 hours, to form an acidic solution or suspension of protonated pigment, (ii) adding the acidic solution or suspension of protonated pigment to about 15 to about 40 parts by weight (preferably 25 to 35 parts by weight), relative to the acidic solution, of a liquid in which the pigment is insoluble, thereby precipitating the pigment, and (iii) collecting and drying the precipitated metal phthalocyanine pigment;

(b) dry milling the precipitated metal phthalocyanine pigment in the presence of about 5 to about 50 parts by weight (preferably 5 to 20 parts by weight and more preferably 10 to 15 parts by weight) of a stabilizer per 100 parts by weight of the crude metal phthalocyanine pigment until the average particle size is reduced to less than about 0.5 μm (preferably from 0.01 to 0.5 μm), preferably over a period of about 4 to about 48 hours;

(c) finishing the milled metal phthalocyanine pigment by thoroughly mixing said milled metal phthalocyanine pigment with a finishing solvent mixture comprising about 3 to about 6 parts by weight (preferably 4 to 5 parts by weight), relative to the crude metal phthalocyanine pigment, of water and about 0.4 to about 1.0 parts by weight (preferably 0.6 to 0.7 parts by weight), relative to the crude metal phthalocyanine pigment, of an organic solvent, optionally in the presence of 0 to about 45 parts by weight (preferably 0 to 15 parts by weight) of a stabilizer per 100 parts by weight of the crude metal phthalocyanine pigment, with the proviso that the total amount of stabilizer used in steps (b) and (c) ranges from about 5 to about 50 parts by weight (preferably 5 to 20 parts by weight) per 100 parts by weight of the crude metal phthalocyanine pigment (preferably at a temperature of about 50° C. to about 145° C. for about 6 to about 12 hours); and (d) isolating the alpha-phase metal phthalocyanine pigment.

DETAILED DESCRIPTION OF THE INVENTION

Although the present invention relates generally to alpha-phase metal phthalocyanine pigments, the most preferred metal phthalocyanine pigments are red-shade alpha-phase copper phthalocyanines. However, although less preferred, other metal-containing phthalocyanine pigments, such as those based on zinc, cobalt, iron, nickel, and other such metals, may also be used. The preferred phthalocyanine pigments of the present invention are unsubstituted but can also be partially substituted (for example, with chlorine, alkyl, or other substituents typical of phthalocyanine pigments).

The pigments prepared according to the present invention are formed as substantially 100% alpha-phase metal phthalocyanines. The term "alpha-phase" (also known as the "alpha-crystal form" or the "alpha-modification") refers to one of the crystalline forms in which the metal phthalocyanines can exist. For example, the two major crystal forms for copper phthalocyanines having commercial impedance are the alpha-crystal form, which has a reddish blue color, and the beta-crystal form, which has a greenish blue color. The X-ray diffraction pattern of these two forms are readily distinguishable.

In step (a) of the process of the present invention, a crude, typically unmilled, metal phthalocyanine pigment having a particle size of about 10 to about 200 μm and existing entirely or almost entirely in the beta-form is treated with aqueous mineral acid (preferably sulfuric acid) in a process known as "acid pasting" (in which an acidic solution containing protonated pigment is formed) or "acid swelling" (in which a suspension of protonated pigment is formed). Although it is possible to use mixtures of beta-phase pigment with alpha-phase pigment, such mixtures are normally not obtained during the preparation of crude pigment. The crude pigment is treated with a sufficient amount of mineral acid, preferably a relatively concentrated acid, to insure formation of an acidic solution or suspension within a reasonable amount of time. However, except for the requirement that the solution or suspension be acidic, the amount and concentration of acid is generally not critical. For example, more dilute acid may be used if the stirring time is extended, but use of the more concentrated acids is preferred for commercial applications. Suitable mineral acids include sulfuric acid and polyphosphoric acid, with sulfuric acid being preferred. It is particularly preferred to use at least 64% aqueous sulfuric acid in amounts of about 4 to 15 parts by weight of acid relative to the quantity of pigment, Although the dissolution rate of crude pigment in sulfuric acid can be increased by warming the mixture (for example, to about 50° C.), it is generally preferred to dissolve the crude pigment in sulfuric acid at or below 35° C. to minimize sulfonation.

After the acid treatment is completed, the pigment is precipitated by adding the strongly acidic solution to a liquid in which the pigments are completely or almost completely insoluble, preferably water or methanol or other lower aliphatic alcohols (such as ethanol, propanol, or butanol), as well as mixtures thereof. Water is most preferred. The precipitated pigment is then collected by methods known in the art, preferably filtration followed by washing to remove residual acid. Other collection methods known in the art, such as centrifugation, are suitable but generally less preferred. The acid-pasted or acid-swelled pigment is then dried for use in the milling step.

The acid-pasted or acid-swelled material from step (a), which is now substantially in the alpha-form, is dry milled to produce pigment having an average particle size of less than 0.5 μm (preferably from about 0.01 to 0.5 μm). The dry milling step (b) can be carried out using procedures known in the art, such as ball milling, in the presence of a stabilizer but in the absence of organic solvents (although small amounts of water can be tolerated).

Suitable stabilizers for dry-milling step (b) include various alkyl-aminoalkyl sulfonamide and carboxamide derivatives of phthalocyanines known in the art. E.g., U.S. Pat. Nos. 3,960,587, 4,039,346, 4,104,276, 4,221,606, 4,310, 359, and 4,313,766, British Patent 784,843, and European Patent Application 422,907. Preferred stabilizers of this type include known compounds of formula (I)

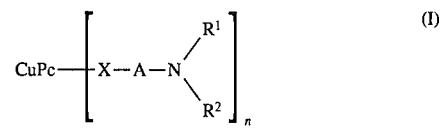

wherein CuPc is an n-valent copper phthalocyanine group; X is a direct bond or, preferably, —SO$_2$—NR$^3$—; A is $C_2$–$C_6$ alkylene; $R^1$ is $C_1$–$C_{20}$ alkyl, ($C_1$–$C_6$ alkoxy)($C_1$–$C_{20}$ alkyl), or $C_5$–$C_7$ cycioalkyl, or $R^1$ and $R^2$ taken together are $C_2$–$C_6$ alkylene; $R^2$ and $R^3$ are independently hydrogen or $C_1$–$C_{20}$ alkyl, or $R^2$ and $R^3$ taken together are $C_2$–$C_3$ alkylene; and n is an integer of from 1 to 4. As used herein, the term "$C_2$–$C_6$ alkylene" refers to straight or branched chain aliphatic hydrocarbon groups having from 2 to 6 carbon atoms and bonded to the amido and amino groups through two different carbon atoms; the term "$C_1$–$C_{20}$ alkyl" refers to straight or branched chain aliphatic hydrocarbon groups having from 1 to 20 carbon atoms; the term "($C_1$–$C_6$ alkoxy)($C_1$–$C_{20}$ alkyl)" refers to $C_1$–$C_{20}$ alkyl substituted, preferably at the ω-position, with a $C_1$–$C_6$ alkyloxy group; and the term "$C_5$–$C_7$ cycloalkyl" refers to cycloaliphatic hydrocarbon groups having from 5 to 7 ring carbon atoms.

The preferred compounds of formula (I) in which X is a sulfonamide group can be prepared, for example, by reaction of mono-, di-, tri-, and tetrasulfonic acid chlorides of copper phthalocyanines or mixtures thereof containing an average of from about two to about four sulfonic acid chloride groups with diamines having the formula $R^3$NH—A—$NR^1R^2$, in which A, $R^1$, $R^2$, and $R^3$ are defined as above. Particularly suitable diamines include 2-(dimethylamino)ethylamine, 2-(diethylamino)ethylamine, 2-(dipropylamino)ethylamine, 2-(dibutylamino)ethylamine, 3-(dimethylamino)propylamine, 3-(diethylamino)propylamine, 3-(dibutylamino)propylamine, 2-(cyclohexylamino)ethylamine, 3-(cyclohexylamino)propylamine, 3-(N-methyl-N-cyclohexylamino)propylamine, 2-(stearylamino)ethylamine, 3-(stearylamino)propylamine, N-methylpiperazine, and 4-(N-methyl-N-diethylamino)butylamine. Particularly preferred stabilizers are N-[3-(dialkylamino)propyl]sulfonamide derivatives of copper phthalocyanine.

To avoid undesirable crystal growth that can produce particles outside the desired size range of about 0.01 to about 0.5 μm, dry milling is preferably carried out at temperatures below about 80° C. (more preferably 40° to 50° C.). Milling must be carried out for a sufficient length of time to allow the particles to reach the desired size range (as determined, for example, by X-ray analysis), but the length of time is not otherwise critical. In general, a period of from about four hours up to about two days is sufficient, the preferred time generally depending on the capacity of the mill used. For example, milling with a laboratory mill might take two or three days, whereas milling with a plant-scale mill might take only eight to twelve hours.

The milled pigment is then finished in step (c) to obtain the required pigmentary size and form by thoroughly mixing (for example, by stirring) with a finishing solvent mixture comprising water and a suitable organic solvent, optionally in the presence of a portion of the stabilizer used in step (b). Although the exact amount of the solvent mixture used during the finishing process is generally not critical, stirrable slurries are typically not obtained when using less than about 3 parts by weight of water and about 1 part by weight of the organic solvent for each part of the crude pigment. It has generally been found particularly advantageous to use about 3 to about 6 parts by weight (preferably 4 to 5 parts by weight) of water and about 0.4 to about 1.0 parts by weight (preferably 0.6 to 0.7 parts by weight) of the organic solvent for each part of crude pigment. Larger quantities of solvent, although effective, are unnecessary and may even be undesirable for economic and environmental reasons. Although it is not necessary to include water during the finishing process, the addition of water allows the use of less organic solvent, thereby providing further economic and environmental advantages.

Suitable organic solvents for step (c) include any organic solvents known in the art for finishing pigments that do not promote conversion of alpha-phase pigments to other crystal forms under the conditions of the process of the invention. Even organic solvents that would ordinarily promote conversion to other crystal forms in the absence of a stabilizer are not excluded as long as such conversion is not significant under the conditions used in step (c). Water-immiscible organic solvents are generally preferred. Examples of suitable water-immiscible finishing solvents include various esters of carboxylic acids, preferably $C_1$–$C_{12}$ alkyl esters of $C_1$–$C_{12}$ aromatic monocarboxylic and/or dicarboxylic acids. Suitable aromatic monocarboxylic acids include benzoic acid and naphthoic acids and isomeric forms thereof, as well as aromatic ring-substituted derivatives in which the substituent can be, for example, alkyl, alkoxy, alkanoyl, halogen, hydroxy, amino, nitro, vinyl, and allyl groups. Suitable aromatic dicarboxylic acids include phthalic, isophthalic, terephthalic, and naphthalic acids and the isomeric forms thereof, as well as aromatic ring-substituted derivatives. Suitable $C_1$–$C_{12}$ alkyl groups include methyl, ethyl, propyl, butyl, pentyl, hexyl, heptyl, octyl, nonyl, decyl, undecyl, and dodecyl, and isomeric forms thereof. Esters of dicarboxylic acids can contain two different alkyl groups, although esters having identical alkyl groups are preferred. Preferred organic solvents include $C_1$–$C_4$ alkyl esters of benzoic, phthalic, and salicylic acids, particularly methyl benzoate, methyl salicylate, and dimethyl phthalate. Mixtures of such esters are, of course, also suitable. Esters of aromatic tricarboxylic and tetracarboxylic acids are suitable but less preferred.

Although esters of aliphatic carboxylic acids are generally much less suited for the finishing process, it is nevertheless possible to use aliphatic esters, including known aliphatic monocarboxylic acid monoesters, dicarboxylic acid diesters, diol diesters, lactones, or cyclic carbonates or mixtures thereof in step (c). Suitable aliphatic esters include those described, for example, in U.S. Pat. No. 5,284,511.

Other types of water-immiscible organic solvents are generally much less suitable for use in finishing step (c), often providing unsuitably weak pigmentary properties.

Although generally less preferred, water-miscible solvents that do not promote to the conversion of the desired alpha-phase pigments to other crystal forms under the conditions of finishing step (c) can be used. For example, certain lower alcohols, such as propanol, isopropyl alcohol, butanol, sec-butyl alcohol, and isobutyl alcohol, are reasonably well suited for finishing step (c). It is also possible to use other water-miscible solvents, such as amides, such as dimethylformamide and dimethylacetamide; ketones and ketone alcohols, such as acetone and diacetone alcohol; ethers, such as tetrahydrofuran and dioxane; alkylene glycols and thioglycols, such as ethylene glycol, propylene glycol, butylene glycol, triethylene glycol, hexylene glycol, and diethylene glycol; polyalkylene glycols, such as polyethylene glycol and polypropylene glycol; other polyols, such as glycerol and 1,2,6-hexanetriol; lower alkyl ethers of polyhydric alcohols, such as 2-methoxyethanol, 2-(2-methoxyethoxy)ethanol, 2-[2-(2methoxyethoxy)ethoxy]ethanol, and 2-[2-(2-ethoxyethoxy)ethoxy]ethanol; small-ring heterocyclic compounds, such as N-methylmorpholine; dialkyl-sulfoxides, such as dimethylsulfoxide; and other such organic liquids known in the art.

Finishing step (c) can be carried out at temperatures in the range of, for example, from about 30° C. to about 145° C. In general, however, temperatures below about 70° C. are less preferred because of a tendency to give less readily dispersed pigment. Although temperatures above about 90° C. can be used, they are less preferred. Finishing must be carried out for a sufficient length of time to allow the particles to attain optimum pigmentary values. Finishing times typically range from about four (preferably at least eight hours) to about twelve hours, but the length of time is not otherwise critical.

The total amount of stabilizer used in steps (b) and (c) should range from about 5 to about 50 parts by weight per 100 parts by weight of crude metal phthalocyanine pigment, although it is generally preferred to use no more than a total of 20 parts by weight. Therefore, if a portion of stabilizer is used in step (c), the amount used in step (c) should typically not exceed 90 percent by weight of the total amount of stabilizer. However, even when using a total amount of stabilizer in steps (b) and (c) that is less than 50 parts by weight, the relative amount of stabilizer used in step (c) is generally less than 90 percent of the total amount.

Isolation step (d) can be carried out by any of several methods known in the art. However, although it is possible in theory to remove the solvent by physical separation methods, it has been found difficult in practice to remove all (or essentially all) of the solvent by purely physical means. Consequently, it has been found particularly advantageous to use esters of carboxylic acids, particularly esters of aromatic carboxylic acids, because they can be readily hydrolyzed and their by-products removed before the pigment is collected. Hydrolysis of such esters can be carried out, for example, by heating the solvent-containing finished pigment with a strongly alkaline solution (preferably an aqueous solution), such as aqueous sodium or potassium hydroxide. A particularly preferred hydrolysis method involves heating the solvent-containing pigment for about two hours at about 85° C. in about 4 to about 10% aqueous sodium hydroxide (prepared, for example, by adding 50% aqueous sodium hydroxide directly to the aqueous finishing mixture). Other hydrolysis methods known in the art would, of course also be suitable. The carboxylate and alcohol by-products formed during hydrolysis can then be removed (and recovered if desired), for example, during the separation step.

The finished alpha-phase pigment can be collected by methods known in the art, preferably filtration, and then dried. Other collection methods known in the art, such as centrifugation, are suitable but generally less preferred. When the pigment is collected by filtration, the hydrolysis by-products can easily be removed when the pigment filter cake is washed, preferably with water. Although generally less preferred, it is also possible to collect the pigment without first removing all of the carboxylate and/or alcohol by-products or after concomitant chemical precipitation of the carboxylate and/or alcohol. For example, a metal carboxylate salt can often provide advantageous surface properties that enhance pigmentary properties. It can sometimes even be advantageous to leave behind a small portion of a solvent itself if the solvent (for example, dimethyl phthalate) can also serve as a plasticizer for the isolated pigment.

Although not generally preferred, it is possible to add to the finished metal phthalocyanine pigment additional amounts of the same stabilizer used in steps (b) and (c). The total amount of stabilizer used should, however, remain in the range of about 5 to about 50 parts by weight (preferably 5 to 20 parts by weight) per 100 parts by weight of crude metal phthalocyanine pigment.

Because of their light stability and migration properties, the metal phthalocyanine pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the metal phthalocyanine pigments of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Test procedures

Pigments prepared according to the Examples were analyzed by transmission electron microscopy using a Zeiss EM 109 instrument. Data were collected under the following conditions:

Acceleration voltage: 80 kV

Magnification: 100,000 X, 40,000 X, and 1,000 X

Differences in color strength, hue, and chroma were measured using an Applied Color System Spectral Sensor (Hunt Associated Laboratories, Fairfax, Va.).

Example 1 (according to the invention)

Crude copper phthalocyanine (available as copper phthalocyanine type SP from Phthalchem/Cychem Inc., Cincinnati, Ohio) (100 g) was added to 600 g of 68% aqueous sulfuric acid and allowed to swell for 24 hours at room temperature. The swelled pigment was diluted with 250 ml of water and then poured with agitation into 3000 ml of cold water. The resultant precipitate was collected by filtration, washed with water until free of acid, and dried in an oven at 80° C.

A mixture of 87.5 g of the dried copper phthalocyanine and 12.5 g of a mixture of N-[3-(dimethylamino)propyl] sulfonamide derivatives of copper phthalocyanine (CAS Registry No. 68411-04-1) were introduced into a ball mill containing 3000 g of steel balls as the grinding element. The capacity of the ball mill was such that it was about 60% full when fully charged. The mill was rotated for 48 hours, after which the resultant powder was poured through a screen that retained the grinding elements. The ball-milled powder was added to water (four times the weight of the pigment) and stirred until thoroughly dispersed. The wetted powder was then treated with methyl benzoate (60% by weight of the pigment powder), then heated to 85° C. and kept at that temperature for eight hours. The treated pigment was cooled and the methyl benzoate was hydrolyzed using 50% aqueous sodium hydroxide at 85° C. for two hours. The resultant mixture was cooled, filtered, washed with water, and dried to give a brilliant reddish-blue alpha-phase copper phthalocyanine pigment.

Example 2 (comparison)

Example 1 of European Patent Application 422,907 was repeated using the same crude copper phthalocyanine and the same N-[(3-dimethylamino)propyl]sulfonamide derivative used in Example 1. In particular, a mixture of 93 g of the dried copper phthalocyanine and 7 g of the sulfonamide derivative was dry milled with an attritor at 55° C. for one hour. The resultant pigment was a mixture of alpha- and beta-crystal forms and exhibited very weak color in comparison to the pigment of Example 1 according to the invention. The following table shows crystal forms and relative color strengths and hues of the comparison pigment and the pigment of Example 1.

TABLE

Color properties of pigments prepared in Examples 1 and 2

| Pigment (Example) | Crystal form | Color strength* | Hue* | ΔH* |
|---|---|---|---|---|
| Ex. 1 | Alpha | 100% | — | 0 |
| Ex. 2 | Alpha & beta mix | 27% | Very green | −5.34 |

*Color strength, hue (qualitative difference in hue), and ΔH (quantitative difference in hue) are relative to the pigment of Example 1.

Example 3 (application)

A mixture of 6 g of the pigment of Example 1 in 12 g of xylene, 4.1 g of butyl acetate, 0.7 g of butanol, and 22.5 g of a 20% solution of cellulose acetobutyrate in 2:1 butyl acetate/xylene was dispersed by agitating for 30 minutes in a shaker containing 2 to 3 mm diameter glass beads. To this dispersion was then added 10 g of a saturated polyester resin (available as DYNAPOL® H 700 from Hals America), 7.3 g of melamine resin, 8.7 g of a 20% solution of cellulose acetobutyrate in 2:1 butyl acetate/xylene, 18 g of butyl acetate, 1.6 g of butanol, and 9.7 g of xylene and shaking was continued for another 5 minutes.

Metallic paints were then prepared by adding a dispersion of aluminum paste (60% solids; available as SPARKLE SILVER® AR from Silberline Manufacturing Co., Inc.) in xylene (about 1:2) in amounts such that the ratio of pigment to aluminum was between about 80:12 and 1:99.

These metallic paints were applied to panels and after drying were coated with a clearcoat based on an acrylate/ melamine resin (which can contain additional additives, such as ultraviolet absorbers). The resulting brilliant metallic reddish blue paint exhibited good light and weather fastness.

What is claimed is:

1. A process for preparing alpha-phase metal phthalocyanine pigments from crude metal phthalocyanine pigments comprising
   (a) acid pasting or acid swelling a crude metal phthalocyanine pigment by
      (i) treating said crude pigment with 4 to 15 parts by weight, relative to the crude metal phthalocyanine pigment, of an aqueous solution of a mineral acid containing 60% to 98% by weight of the mineral acid to form an acidic solution or suspension of protonated pigment,
      (ii) adding the acidic solution or suspension of protonated pigment to 15 to 40 parts by weight, relative to the acidic solution, of a liquid in which the pigment is substantially insoluble, thereby precipitating the pigment, and
      (iii) collecting and drying the precipitated metal phthalocyanine pigment;
   (b) dry milling the precipitated metal phthalocyanine pigment in the presence of 5 to 50 parts by weight of a stabilizer per 100 parts by weight of the crude metal phthalocyanine pigment until the average particle size is reduced to less than 0.5 μm;
   (c) finishing the milled metal phthalocyanine pigment by thoroughly mixing said milled metal phthalocyanine pigment with a finishing solvent mixture comprising 3 to 6 parts by weight, relative to the crude metal phthalocyanine pigment, of water and 0.4 to 1.0 parts by weight, relative to the crude metal phthalocyanine pigment, of an organic solvent, optionally in the presence of 0 to 45 parts by weight of a stabilizer per 100 parts by weight of the crude metal phthalocyanine pigment, with the proviso that the total amount of stabilizer used in steps (b) and (c) ranges from 5 to 50 parts by weight per 100 parts by weight of the crude metal phthalocyanine pigment; and
   (d) isolating the alpha-phase metal phthalocyanine pigment.

2. A process according to claim 1 wherein the metal phthalocyanine pigment is a copper phthalocyanine pigment.

3. A process according to claim 1 wherein the aqueous solution of the mineral acid used in step (a)(i) contains 64% to 70% by weight of the mineral acid.

4. A process according to claim 1 wherein the mineral acid used in step (a)(i) is sulfuric acid.

5. A process according to claim 1 wherein step (a)(i) is carried out at a temperature of 10° to 60° C. for 4 to 24 hours.

6. A process according to claim 1 wherein the pigment is precipitated in step (a)(ii) by adding the acidic solution or suspension of protonated pigment to water, methanol, ethanol, propanol, butanol, or a mixture thereof.

7. A process according to claim 1 wherein the stabilizer used in step (b) is a compound of the formula

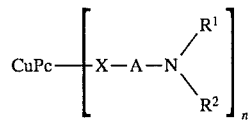

wherein CuPc is an n-valent copper phthalocyanine group; X is a direct bond or —SO$_2$—NR$^3$—; A is C$_2$–C$_6$ alkylene;

$R^1$ is $C_1$–$C_{20}$ alkyl, ($C_1$–$C_6$ alkoxy)($C_1$–$C_{20}$ alkyl), or $C_5$–$C_7$ cycloalkyl, or $R^1$ and $R^2$ taken together are $C_2$–$C_6$ alkylene; $R^2$ and $R^3$ are independently hydrogen or $C_1$–$C_{20}$ alkyl, or $R^2$ and $R^3$ taken together are $C_2$–$C_3$ alkylene; and n is an integer of from 1 to 4.

8. A process according to claim 1 wherein the stabilizer used in step (b) is a N-[3-(dimethylamino)propyl]sulfonamide derivative of copper phthalocyanine.

9. A process according to claim 1 wherein 5 to 20 parts by weight of the stabilizer are used per 100 parts by weight of the crude metal phthalocyanine pigment.

10. A process according to claim 1 wherein step (b) is carried out over a period of 4 to 48 hours.

11. A process according to claim 1 wherein the organic solvent used in step (c) is a $C_1$–$C_{12}$ alkyl ester of a $C_1$–$C_{12}$ aromatic mono-carboxylic and/or dicarboxylic acid.

12. A process according to claim 1 wherein the organic solvent used in step (c) is a $C_1$–$C_4$ alkyl ester of benzoic, phthalic, or salicylic acid.

13. A process according to claim I wherein the organic solvent used in step (c) is methyl benzoate, methyl salicylate, or dimethyl phthalate.

14. A process according to claim 1 wherein step (c) is carried out at a temperature of 50° C. to 145° C. for 6 to 12 hours.

15. A process according to claim 1 comprising
   (a) acid pasting or acid swelling a crude metal phthalocyanine pigment by
      (i) treating said crude pigment with 4 to 10 parts by weight, relative to the crude metal phthalocyanine pigment, of an aqueous solution of a mineral acid containing 60% to 98% by weight of the mineral acid to form an acidic solution or suspension of protonated pigment,
      (ii) adding the acidic solution or suspension of protonated pigment to 15 to 40 parts by weight, relative to the acidic solution, of a liquid in which the pigment is substantially insoluble, thereby precipitating the pigment, and
      (iii) collecting and drying the precipitated metal phthalocyanine pigment;
   (b) dry milling the precipitated metal phthalocyanine pigment in the presence of 5 to 50 parts by weight of a stabilizer per 100 parts by weight of the crude metal phthalocyanine pigment until the average particle size is reduced to less than 0.5 μm;
   (c) finishing the milled metal phthalocyanine pigment by thoroughly mixing said milled metal phthalocyanine pigment with a finishing solvent mixture comprising 3 to 6 parts by weight, relative to the crude metal phthalocyanine pigment, of water and 0.4 to 1.0 parts by weight, relative to the crude metal phthalocyanine pigment, of a $C_{1-C12}$ alkyl ester of a $C_1$–$C_{12}$ aromatic monocarboxylic and/or dicarboxylic acid, optionally in the presence of 0 to 45 parts by weight of a stabilizer per 100 parts by weight of the crude metal phthalocyanine pigment, with the proviso that the total amount of stabilizer used in steps (b) and (c) ranges from 5 to 50 parts by weight per 100 parts by weight of the crude metal phthalocyanine pigment; and
   (d) isolating the alpha-phase metal phthalocyanine pigment by
      (i) hydrolyzing the $C_1$–$C_{12}$ alkyl ester of a $C_1$–$C_{12}$ aromatic monocarboxylic and/or dicarboxylic acid used in step (c), and
      (ii) collecting the alpha-phase metal phthalocyanine pigment.

16. A process according to claim 15 wherein the $C_1$–$C_{12}$ alkyl ester of a $C_1$–$C_{12}$ aromatic monocarboxylic and/or dicarboxylic acid is hydrolyzed in step (d)(i) with 4 to 10% aqueous sodium hydroxide heated at 85° C. for two hours.

17. A process according to claim 15 wherein the alpha-phase metal phthalocyanine pigment is collected in step (d)(ii) by filtration.

18. A process according to claim 15 wherein the metal phthalocyanine pigment is a copper phthalocyanine pigment.

19. An alpha-phase metal phthalocyanine pigment conditioned by the process of claim 1.

20. A paint containing a colorant wherein said colorant comprises an alpha-phase metal phthalocyanine pigment conditioned by the process of claim 1.

* * * * *